United States Patent
Huang et al.

(10) Patent No.: US 12,555,874 B2
(45) Date of Patent: Feb. 17, 2026

(54) BATTERY AND ELECTRIC DEVICE

(71) Applicant: Ningde Amperex Technology Limited, Ningde (CN)

(72) Inventors: Chu Huang, Ningde (CN); Shikang Luo, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 661 days.

(21) Appl. No.: 17/956,230

(22) Filed: Sep. 29, 2022

(65) Prior Publication Data
US 2023/0094497 A1 Mar. 30, 2023

(30) Foreign Application Priority Data
Sep. 30, 2021 (CN) .......................... 202111162410.2

(51) Int. Cl.
*H01M 50/538* (2021.01)
*H01M 50/121* (2021.01)

(52) U.S. Cl.
CPC ....... *H01M 50/538* (2021.01); *H01M 50/121* (2021.01)

(58) Field of Classification Search
CPC ... H01M 50/538; H01M 50/121; H01M 50/40
See application file for complete search history.

(56) References Cited

U.S. PATENT DOCUMENTS

2022/0294083 A1 9/2022 Zhou et al.

FOREIGN PATENT DOCUMENTS

| CN | 201927677 U | 8/2011 |
|---|---|---|
| CN | 102945929 A | 2/2013 |
| CN | 106532105 A | 3/2017 |
| CN | 208819997 U | 5/2019 |
| CN | 112886144 A | 6/2021 |
| CN | 213483795 U | 6/2021 |
| WO | 2010063364 A1 | 6/2010 |

OTHER PUBLICATIONS

Machine Translation of: Jiao et al., CN 201927677 U, Aug. 10, 2011.*
Office Action dated Dec. 15, 2023, issued in counterpart CN Application No. 202111162410.2. (7 pages).

* cited by examiner

*Primary Examiner* — Kenneth J Douyette
(74) *Attorney, Agent, or Firm* — WHDA, LLP (57) ABSTRACT

A battery, including a housing, a first electrode assembly, a first positive tab, a first negative tab, a second electrode assembly, a second positive tab, and a second negative tab. The first positive tab and the first negative tab are connected to the first electrode assembly. The second positive tab and the second negative tab are connected to the second electrode assembly. The battery further includes a partition piece. The partition piece is connected to the housing to define a first cavity and a second cavity on two sides of the partition piece respectively. The first electrode assembly is disposed in the first cavity, and the second electrode assembly is disposed in the second cavity. The partition piece contains a conductive region. The first positive tab and the second negative tab are electrically connected to the conductive region. The battery can increase the energy density of the battery.

16 Claims, 6 Drawing Sheets

BATTERY AND ELECTRIC DEVICE

CROSS REFERENCE TO RELATED APPLICATIONS

The present application claims the benefit of priority from the China Patent Application No. 202111162410.2, filed on 30 Sep. 2021, the disclosure of which is hereby incorporated by reference in its entirety.

TECHNICAL FIELD

This application relates to the technical field of batteries, and in particular, to a battery and an electric device.

BACKGROUND

Currently, to obtain a relatively high output voltage, a plurality of batteries are usually connected in series in an electric device. In the prior art, the series connection is implemented by using finished batteries, and tabs are externally connected in series, consequently needing to occupy a part of space in a battery pack and reducing an energy density of the battery.

SUMMARY

In view of the fact above, it is necessary to provide a battery and an electric device in which the battery is mounted, so as to increase the energy density of the battery.

According to a first aspect of this application, a battery is provided, including a housing, a first electrode assembly, a first positive tab, a first negative tab, a second electrode assembly, a second positive tab, and a second negative tab. The first positive tab and the first negative tab are connected to the first electrode assembly. The second positive tab and the second negative tab are connected to the second electrode assembly. The battery further includes a partition piece. The partition piece is connected to the housing to define a first cavity and a second cavity on two sides of the partition piece respectively. The first electrode assembly is disposed in the first cavity, and the second electrode assembly is disposed in the second cavity. The partition piece contains a conductive region. The first positive tab and the second negative tab are electrically connected to the conductive region.

The partition piece is connected to the housing and disposed between the first electrode assembly and the second electrode assembly to physically isolate the first electrode assembly from the second electrode assembly. The first positive tab and the second negative tab are electrically connected to the conductive region, so that the first electrode assembly is connected in series to the second electrode assembly inside the housing. Compared with an existing practice in which the plurality of tabs of the batteries are connected in series outside the housing, the battery according to this application needs to lead just a pair of tabs with opposite polarities out of the housing to serve as positive and negative terminals of the electrode assemblies connected in series. The remaining tabs are connected in series inside the housing through being connected to the conductive region of the partition piece. By reducing the number of tabs leading out of the housing, the space that needs to be reserved for connecting the tabs is reduced on a circuit board connected to the battery, thereby making it convenient to simplify the structure of the circuit board, reducing the space to be occupied for packaging of the battery and the circuit board, and increasing the energy density of the battery.

In some embodiments of this application, the partition piece further contains an insulation region. In the insulation region, the partition piece includes a first insulation layer, a conductive layer, and a second insulation layer that are stacked in sequence. The first insulation layer and the second insulation layer are connected to the housing separately. In the conductive region, the partition piece includes the conductive layer. The first positive tab and the second negative tab are electrically connected to the conductive layer separately.

The first insulation layer, the conductive layer, and the second insulation layer that are stacked together are configured to increase the structural strength of the partition piece. The first insulation layer and the second insulation layer are disposed on two sides of the conductive layer respectively, and are connected to the housing separately, so that the conductive layer is insulated from the housing. The conductive layer is sandwiched between the first insulation layer and the second insulation layer. The conductive layer in the conductive region is exposed from the first insulation layer and the second insulation layer, so that it is convenient for the first positive tab and the second negative tab to pass through the first insulation layer and the second insulation layer respectively and electrically connect to the conductive layer.

In some embodiments of this application, the partition piece further includes an extension portion. The extension portion is electrically connected to the conductive layer and extends out of the housing. The extension portion may be configured to connect to an external detection device so that it is convenient to detect parameters of the battery such as voltage, internal resistance, and capacity.

In some embodiments of this application, the housing includes a first packaging body and a second packaging body. The first packaging body is connected to the first insulation layer to define the first cavity. The second packaging body is connected to the second insulation layer to define the second cavity. The first negative tab extends out of the housing from between the first packaging body and the partition piece. The second positive tab extends out of the housing from between the second packaging body and the partition piece.

Serving as an overall negative terminal of the first electrode assembly and the second electrode assembly, the first negative tab is connected to the circuit board. Serving as an overall positive terminal of the first electrode assembly and the second electrode assembly, the second positive tab is connected to the circuit board. By connecting the first packaging body and the second packaging body to the partition piece separately, it is convenient to dispose the first electrode assembly and the second electrode assembly in the first cavity and the second cavity respectively. Further, the partition piece disposed between the first packaging body and the second packaging body can increase the structural strength of the housing.

In some embodiments of this application, the housing includes a first packaging body and a second packaging body. The first packaging body is connected to the first insulation layer to define the first cavity. The second packaging body is connected to the second insulation layer to define the second cavity. The first packaging body includes a first conductive portion. The second packaging body includes a second conductive portion. The first negative tab is electrically connected to the first conductive portion and accommodated in the first cavity. The second positive tab is electrically connected to the second conductive portion and accommodated in the second cavity.

Serving as an overall negative terminal of the first electrode assembly and the second electrode assembly, the first conductive portion is connected to the circuit board. Serving as an overall positive terminal of the first electrode assembly and the second electrode assembly, the second conductive portion is connected to the circuit board. By connecting the first packaging body and the second packaging body to the partition piece separately, it is convenient to dispose the first electrode assembly and the second electrode assembly in the first cavity and the second cavity respectively. Further, the partition piece disposed between the first packaging body and the second packaging body can increase the structural strength of the housing.

In some embodiments of this application, the first packaging body and the second packaging body each independently include at least one of aluminum, aluminum alloy, nickel, nickel alloy, steel, or stainless steel.

In some embodiments of this application, the first insulation layer and the second insulation layer each independently include at least one of polypropylene, acid anhydride modified polypropylene, polyethylene, poly(ethylene-co-vinyl acetate), poly(ethylene-co-ethyl acrylate), poly(ethylene-co-acrylic acid), poly(ethylene-co-vinyl alcohol), polyvinyl chloride, polystyrene, polyether nitrile, polyurethane, polyamide, polyester, poly(amorphous α-co-olefin), or a derivative thereof; and the conductive layer includes at least one of Ni, Ti, Cu, Ag, Au, Pt, Fe, Co, Cr, W, Mo, Al, Mg, K, Na, Ca, Sr, Ba, Si, Ge, Sb, Pb, In, Zn, stainless steel, or a combination or alloy thereof.

In some embodiments of this application, a thickness direction of the first electrode assembly is a first direction. The first electrode assembly and the second electrode assembly are stacked along the first direction. The foregoing disposition reduces the space occupied by the battery in the length direction and the width direction, and increases the energy density of the battery.

In some embodiments of this application, the first electrode assembly is a jelly-roll structure or a stacked structure. The second electrode assembly is a jelly-roll structure or a stacked structure.

A second aspect of this application provides an electric device. The electric device includes any one of the batteries according to the foregoing embodiments.

In the battery and the electric device in which the battery is mounted, the partition piece is connected to the housing and disposed between the first electrode assembly and the second electrode assembly to physically isolate the first electrode assembly from the second electrode assembly. The first positive tab and the second negative tab are electrically connected to the conductive region, so that the first electrode assembly is connected in series to the second electrode assembly inside the housing. Compared with an existing practice in which the plurality of tabs of the batteries are connected in series outside the housing, the battery according to this application needs to lead just a pair of tabs with opposite polarities out of the housing to serve as positive and negative terminals of the electrode assemblies connected in series. The remaining tabs are connected in series inside the housing through being connected to the conductive region of the partition piece. By reducing the number of tabs leading out of the housing, the space that needs to be reserved for connecting the tabs is reduced on a circuit board connected to the battery, thereby making it convenient to simplify the structure of the circuit board, reducing the space to be occupied for packaging of the battery and the circuit board, and increasing the energy density of the battery.

REFERENCE NUMERALS OF MAIN COMPONENTS

Battery 100
Electric device 200
Housing 10
First cavity 10a
Second cavity 10b
First packaging body 11
First recess 111
First seal edge portion 112
First conductive portion 113
Second packaging body 12
Second recess 121
Second seal edge portion 122
Second conductive portion 123
Explosion-proof valve 13
Injection port 14
Sealing stud 15
First electrode assembly 20
First positive tab 21
First negative tab 22
First end 23
Second end 24
Second electrode assembly 30
Second positive tab 31
Second negative tab 32
Third end 33
Fourth end 34
Partition piece 40
First insulation layer 40a
Conductive layer 40b
Second insulation layer 40c
Conductive region 41
Insulation region 42
First via hole 43
Second via hole 44
Extension portion 45

First direction Z
Second direction X
Third direction Y

DETAILED DESCRIPTION OF EMBODIMENTS

The following describes the technical solutions in the embodiments of this application with reference to the drawings hereto. Evidently, the described embodiments are merely a part of but not all of the embodiments of this application.

It needs to be noted that a component considered to be "connected to" another component may be directly connected to the other component or may be connected to the other component through an intermediate component. A component considered to be "disposed on" another component may be directly disposed on the other component or may be disposed on the other component through an intermediate component.

Unless otherwise defined, all technical and scientific terms used herein have the same meanings as usually understood by a person skilled in the technical field of this application. The terms used in the specification of this application herein are merely intended for describing specific embodiments but are not intended to limit this application. The term "and/or" used herein includes any and all combinations of one or more related items preceding and following the term.

According to a first aspect of this application, a battery is provided, including a housing, a first electrode assembly, a first positive tab, a first negative tab, a second electrode assembly, a second positive tab, and a second negative tab. The first positive tab and the first negative tab are connected to the first electrode assembly. The second positive tab and the second negative tab are connected to the second electrode assembly. The battery further includes a partition piece. The partition piece is connected to the housing to define a first cavity and a second cavity on two sides of the partition piece respectively. The first electrode assembly is disposed in the first cavity, and the second electrode assembly is disposed in the second cavity. The partition piece contains a conductive region. The first positive tab and the second negative tab are electrically connected to the conductive region.

In the battery according to this embodiment of this application, the partition piece is connected to the housing and disposed between the first electrode assembly and the second electrode assembly to physically isolate the first electrode assembly from the second electrode assembly. The first positive tab and the second negative tab are electrically connected to the conductive region, so that the first electrode assembly is connected in series to the second electrode assembly inside the housing. Compared with an existing practice in which the plurality of tabs of the batteries are connected in series outside the housing, the battery according to this application needs to lead just a pair of tabs with opposite polarities out of the housing to serve as positive and negative terminals of the electrode assemblies connected in series. The remaining tabs are connected in series inside the housing through being connected to the conductive region of the partition piece. By reducing the number of tabs leading out of the housing, the space that needs to be reserved for connecting the tabs is reduced on a circuit board connected to the battery, thereby making it convenient to simplify the structure of the circuit board, reducing the space to be occupied for packaging of the battery and the circuit board, and increasing the energy density of the battery.

The following describes some embodiments in detail with reference to drawings. To the extent that no conflict occurs, the following embodiments and the features in the embodiments may be combined with each other.

Figure 1:
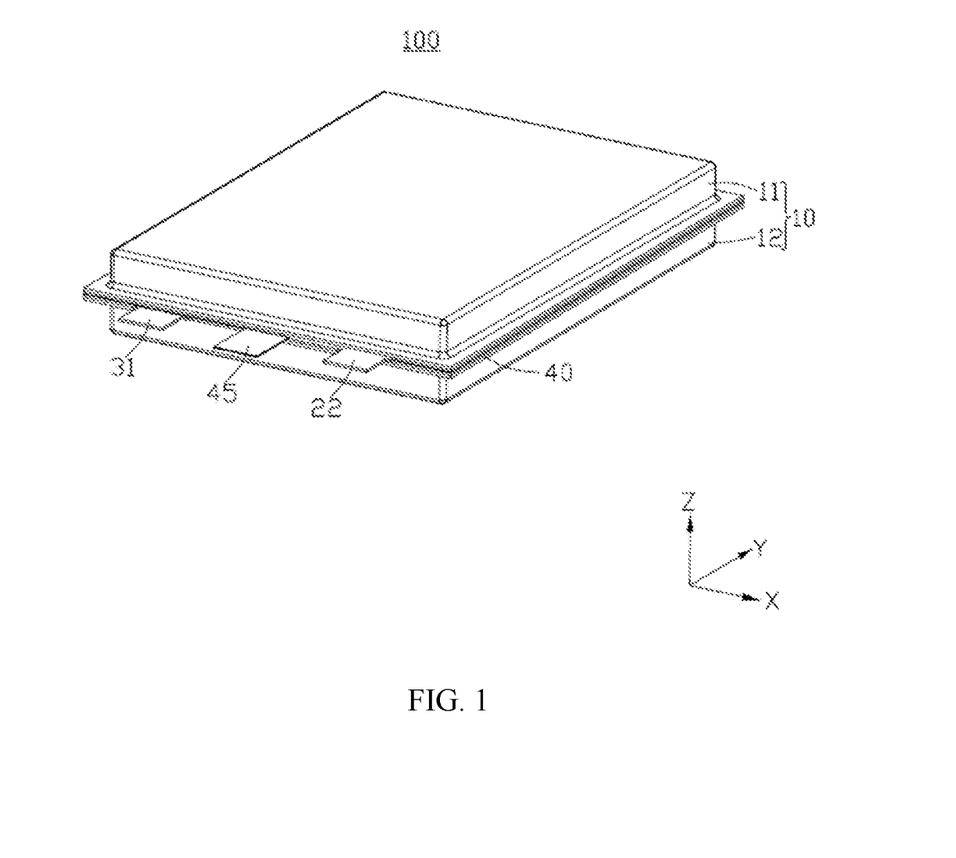
FIG. 1 is a first schematic structural diagram of a battery according to an embodiment of this application.
Figure 2:
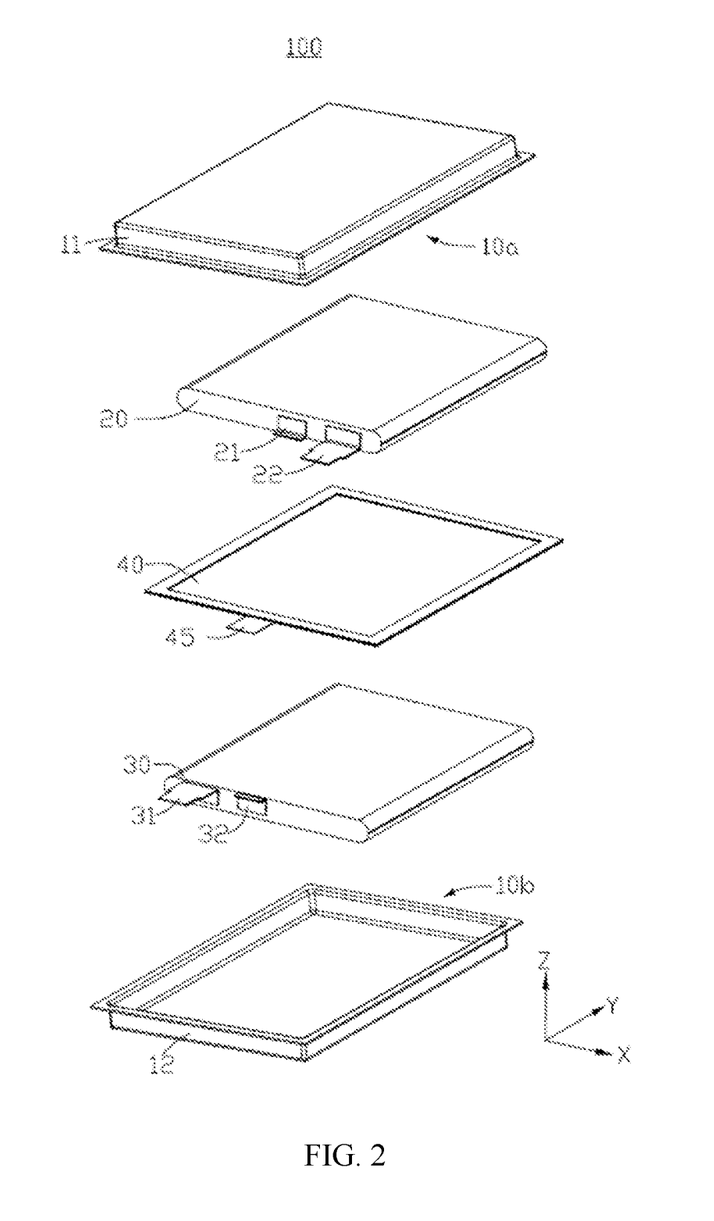
FIG. 2 is a first schematic exploded view of a structure of a battery according to an embodiment of this application.

Referring to FIG. 1 and FIG. 2, an embodiment of this application provides a battery 100. The battery 100 includes a housing 10, a first electrode assembly 20, a first positive tab 21, a first negative tab 22, a second electrode assembly 30, a second positive tab 31, and a second negative tab 32. The first positive tab 21 and the first negative tab 22 are connected to the first electrode assembly 20. The second positive tab 31 and the second negative tab 32 are connected to the second electrode assembly 30.

The first electrode assembly 20 and the second electrode assembly 30 are disposed in the housing 10. The battery 100 further includes a partition piece 40. The partition piece 40 is connected to the housing 10 to define a first cavity 10a and a second cavity 10b on two sides of the partition piece 40 respectively. The first electrode assembly 20 is disposed in the first cavity 10a, and the second electrode assembly 30 is disposed in the second cavity 10b.

Figure 3:
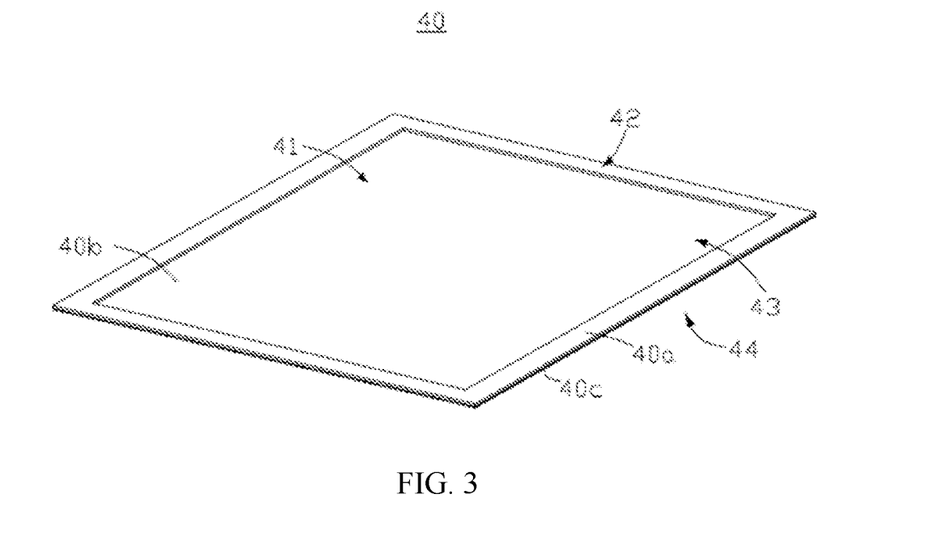
FIG. 3 is a first schematic structural diagram of a partition piece in a battery according to an embodiment of this application.

Referring to FIG. 3, the partition piece 40 contains a conductive region 41. In some embodiments, the first positive tab 21 and the second negative tab 32 are electrically connected to the conductive region 41, so that the first electrode assembly 20 is connected in series to the second electrode assembly 30 through the conductive region 41. The first negative tab 22 and the second positive tab 31 extend out of the housing 10 to serve as a positive terminal and a negative terminal, respectively, of the first electrode assembly 20 and the second electrode assembly 30 that are connected in series, for a purpose of connecting during charging and discharging.

Understandably, in some embodiments, the first negative tab 22 and the second positive tab 31 are electrically connected to the conductive region 41, so that the first electrode assembly 20 is connected in series to the second electrode assembly 30 through the conductive region 41. The first positive tab 21 and the second negative tab 32 extend out of the housing 10 to serve as a positive terminal and a negative terminal, respectively, of the first electrode assembly 20 and the second electrode assembly 30 that are connected in series, for a purpose of connecting during charging and discharging.

In the battery 100, the partition piece 40 is connected to the housing 10 and disposed between the first electrode assembly 20 and the second electrode assembly 30 to physically isolate the first electrode assembly 20 from the second electrode assembly 30. The first positive tab 21 and the second negative tab 32 are electrically connected to the conductive region 41, so that the first electrode assembly 20 is connected in series to the second electrode assembly 30 inside the housing 10.

Compared with an existing practice in which the plurality of tabs of the batteries are externally connected in series, the battery 100 according to this application needs to lead just a pair of tabs with opposite polarities out of the housing 10 to serve as positive and negative terminals of the electrode assemblies connected in series. The remaining tabs are connected in series inside the housing through being connected to the conductive region 41 of the partition piece 40. By reducing the number of tabs leading out of the housing 10, the space that needs to be reserved for connecting the tabs is reduced on a circuit board connected to the battery 100, thereby making it convenient to simplify the structure of the circuit board, reducing the space to be occupied for packaging of the battery 100 and the circuit board, increasing the energy density of the battery 100, and reducing production cost.

In some embodiments, the first electrode assembly 20 is a jelly-roll structure or a stacked structure. The second electrode assembly 30 is a jelly-roll structure or a stacked structure. Specifically, the first electrode assembly 20 and the second electrode assembly 30 each are formed by winding or stacking a positive electrode plate, a separator, and a negative electrode plate that are arranged in sequence.

In some embodiments, the battery 100 further includes n third electrode assemblies, a third positive tab and a third negative tab connected to the third electrode assembly. The first electrode assembly 20, the second electrode assembly 30, and the n third electrode assemblies are disposed in the housing 10. The battery 100 includes n+1 partition pieces 40. The n+1 partition pieces 40 are connected to the housing 10 to define n+2 cavities. One of the cavities is configured to accommodate the first electrode assembly 20. Another cavity is configured to accommodate the second electrode assembly 30. The remaining n cavities each are configured to accommodate a third electrode assembly. The first electrode assembly 20, the second electrode assembly 30, and the n third electrode assemblies are internally connected in series through the conductive region 41 of the corresponding partition piece 40. A pair of tabs with opposite polarities are led out of the housing 10 to serve as a positive terminal and a negative terminal, respectively, of the electrode assemblies connected in series.

In some embodiments, the value of n may be a natural number such as 1, 2, 3, 4, 5, 6, 7, 8, 9, or 10.

Referring to FIG. 3, in some embodiments, the partition piece 40 further contains an insulation region 42. The insulation region 42 is configured to connect to the housing 10, so as to insulate the conductive region 41 from the housing 10. Specifically, in the insulation region 42, the partition piece 40 includes a first insulation layer 40a, a conductive layer 40b, and a second insulation layer 40c that are stacked in sequence. The first insulation layer 40a and the second insulation layer 40c are connected to the housing 10 separately. In the conductive region 41, the partition piece 40 includes the conductive layer 40b. The first positive tab 21 and the second negative tab 32 are electrically connected to the conductive layer 40b separately.

The first insulation layer 40a, the conductive layer 40b, and the second insulation layer 40c that are stacked together are configured to increase the structural strength of the partition piece 40. The first insulation layer 40a and the second insulation layer 40c are disposed on two sides of the conductive layer 40b respectively, and are connected to the housing 10 separately, so that the conductive layer 40b is insulated from the housing 10. The conductive layer 40b is sandwiched between the first insulation layer 40a and the second insulation layer 40c. The conductive layer 40b in the conductive region 41 is exposed from the first insulation layer 40a and the second insulation layer 40c, so that it is convenient for the first positive tab 21 and the second negative tab 32 to pass through the first insulation layer 40a and the second insulation layer 40c respectively and electrically connect to the conductive layer 40b.

In some embodiments, the insulation region 42 is disposed around the conductive region 41. The insulation region 42 further extends along a contour at a joint between the housing 10 and the partition piece 40. In this way, the insulation region 42 is connected to the housing 10, and the conductive region 41 is located in the housing 10.

Specifically, in some embodiments, a first via hole 43 is disposed at a part of the first insulation layer 40a corresponding to the conductive region 41. A surface of the conductive layer 40b facing the first insulation layer 40a in the conductive region 41 is exposed from the first via hole 43. A second via hole 44 is disposed at a part of the second insulation layer 40c corresponding to the conductive region 41. A surface of the conductive layer 40b facing the second insulation layer 40c in the conductive region 41 is exposed from the second via hole 44.

In some embodiments, the first insulation layer 40a and the second insulation layer 40c each independently include at least one of polypropylene, acid anhydride modified polypropylene, polyethylene, poly(ethylene-co-vinyl acetate), poly(ethylene-co-ethyl acrylate), poly(ethylene-co-acrylate), poly(ethylene-co-vinyl alcohol), polyvinyl chloride, polystyrene, polyether nitrile, polyurethane, polyamide, polyester, poly(amorphous α-co-olefin), or a derivative thereof. The conductive layer 40b includes at least one of Ni, Ti, Cu, Ag, Au, Pt, Fe, Co, Cr, W, Mo, Al, Mg, K, Na, Ca, Sr, Ba, Si, Ge, Sb, Pb, In, Zn, stainless steel, or a combination or alloy thereof.

Figure 4:
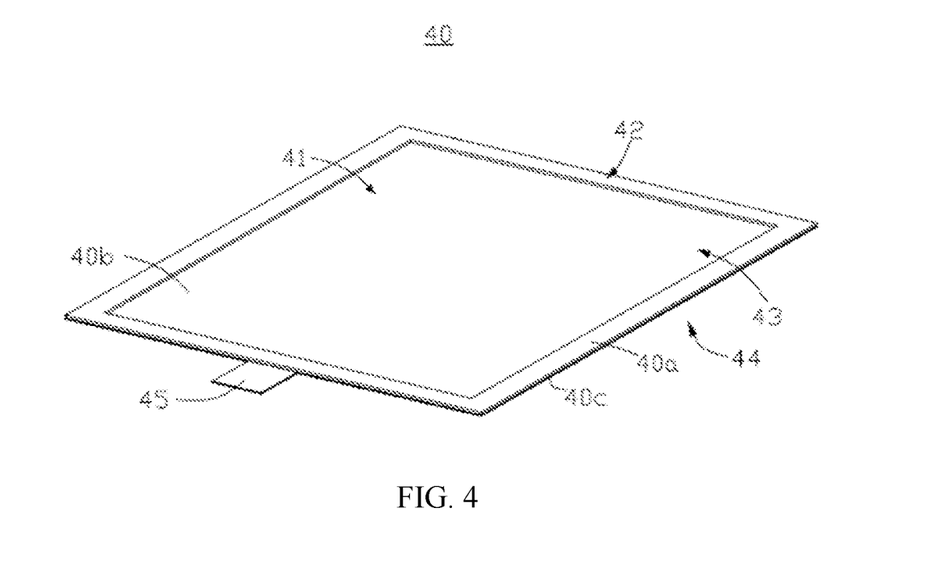
FIG. 4 is a second schematic structural diagram of a partition piece in a battery according to an embodiment of this application.

Referring to FIG. 4, in some embodiments, the partition piece 40 further includes an extension portion 45. The extension portion 45 is electrically connected to the conductive layer 40b and extends out of the housing 10. The extension portion 45 may be configured to connect to an external detection device so that it is convenient to detect parameters of the battery 100 such as voltage, internal resistance, and capacity.

Figure 5:
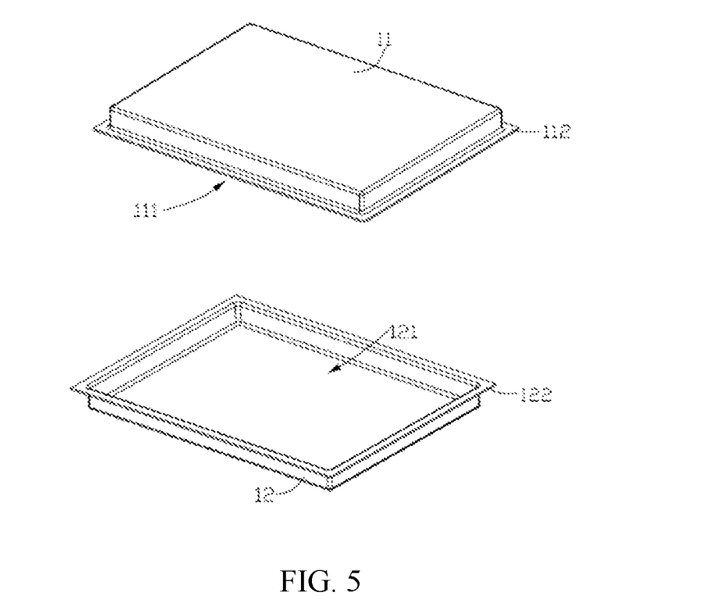
FIG. 5 is a first schematic structural diagram of a first packaging body and a second packaging body in a battery according to an embodiment of this application.

Referring to FIG. 5, in some embodiments, the housing 10 includes a first packaging body 11 and a second packaging body 12. The first packaging body 11 is connected to the first insulation layer 40a to define the first cavity 10a. The second packaging body 12 is connected to the second insulation layer 40c to define the second cavity 10b. The first negative tab 22 extends out of the housing 10 from between the first packaging body 11 and the partition piece 40. The second positive tab 31 extends out of the housing 10 from between the second packaging body 12 and the partition piece 40.

The first electrode assembly 20 and the second electrode assembly 30 in use need to be electrically connected to a circuit board. The circuit board is configured to control the charging and discharging of the battery 100 and connect to an electric device. Serving as an overall negative terminal of the first electrode assembly 20 and the second electrode assembly 30, the first negative tab 22 is connected to the circuit board. Serving as an overall positive terminal of the first electrode assembly 20 and the second electrode assembly 30, the second positive tab 31 is connected to the circuit board, so as to reduce the number of tabs connected to the circuit board. In this way, the space that needs to be reserved for connecting the tabs is reduced on the circuit board connected to the battery 100, and the energy density of the battery 100 is increased.

By connecting the first packaging body 11 and the second packaging body 12 to the partition piece 40 separately, it is convenient to dispose the first electrode assembly 20 and the second electrode assembly 30 in the first cavity 10a and the second cavity 10b respectively. Further, the partition piece 40 disposed between the first packaging body 11 and the second packaging body 12 can increase the structural strength of the housing 10.

In some embodiments, the first packaging body 11 is provided with a first recess 111. The first recess 111 is configured to accommodate the first electrode assembly 20. The second packaging body 12 is provided with a second recess 121. The second recess 121 is configured to accommodate the second electrode assembly 30. The first packaging body 11 is further provided with a first seal edge portion 112. The first seal edge portion 112 extends outward from an edge of an opening of the first recess 111. The first seal edge portion 112 is connected to the first insulation layer 40a. The second packaging body 12 is further provided with a second seal edge portion 122. The second seal edge portion 122 extends outward from an edge of an opening of the second recess 121. The second seal edge portion 122 is connected to the second insulation layer 40c. By using the first seal edge portion 112, the connection area between the first packaging body 11 and the first insulation layer 40a increases. By using the second seal edge portion 122, the connection area between the second packaging body 12 and the second insulation layer 40c increases. This improves the stability of connection from the first packaging body 11 and the second packaging body 12 to the partition piece 40.

In some embodiments, the first packaging body 11 and the second packaging body 12 each independently include at least one of an aluminum plastic film or a steel plastic film.

Figure 6:
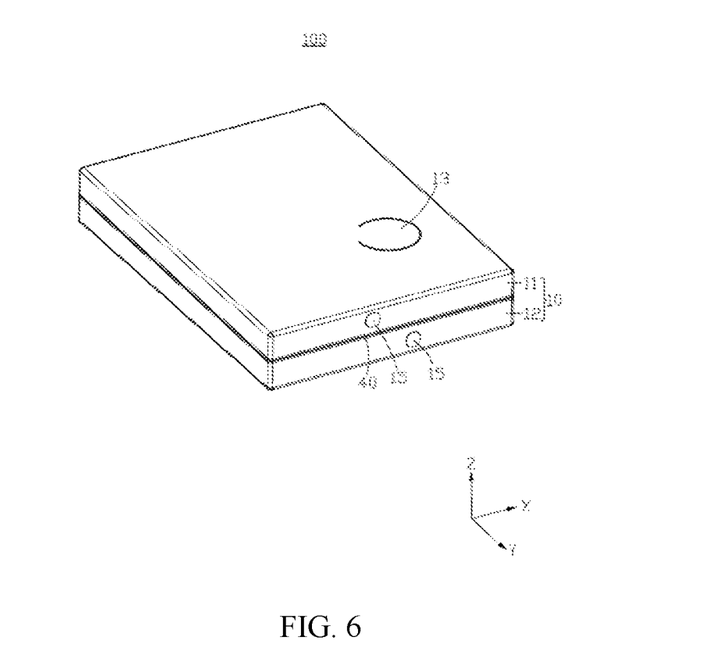
FIG. 6 is a second schematic structural diagram of a battery according to an embodiment of this application.
Figure 7:
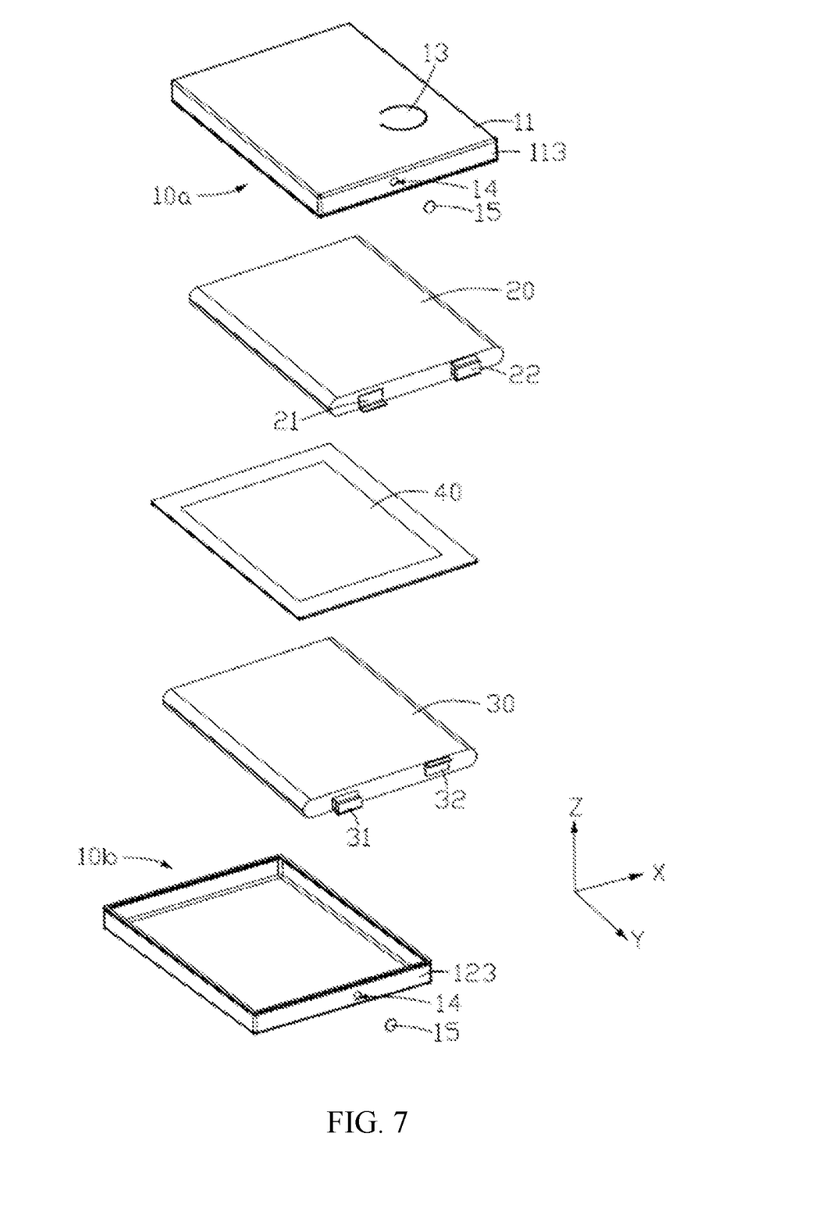
FIG. 7 is a second schematic exploded view of a structure of a battery according to an embodiment of this application.

Referring to FIG. 6 and FIG. 7, in some embodiments, the housing 10 includes a first packaging body 11 and a second packaging body 12. The first packaging body 11 is connected to the first insulation layer 40a to define the first cavity 10a. The second packaging body 12 is connected to the second insulation layer 40c to define the second cavity 10b. The first packaging body 11 includes a first conductive portion 113. The second packaging body 12 includes a second conductive portion 123. The first negative tab 22 is electrically connected to the first conductive portion 113 and accommodated in the first cavity 10a. The second positive tab 31 is electrically connected to the second conductive portion 123 and accommodated in the second cavity 10b.

In some embodiments, the first conductive portion 113 may be a sidewall of the first packaging body 11 corresponding to the first recess 111, and the second conductive portion 123 may be a sidewall of the second packaging body 12 corresponding to the second recess 121. Understandably, in other embodiments, the first conductive portion 113 may be the entirety of the first packaging body 11, and the second conductive portion 123 may be the entirety of the second packaging body 12.

The first electrode assembly 20 and the second electrode assembly 30 in use need to be electrically connected to a circuit board. Then the circuit board is connected to an electric device. Serving as an overall negative terminal of the first electrode assembly 20 and the second electrode assembly 30, the first conductive portion 113 is connected to the circuit board. Serving as an overall positive terminal of the first electrode assembly 20 and the second electrode assembly 30, the second conductive portion 123 is connected to the circuit board, so as to reduce the number of tabs connected to the circuit board. In this way, the space that needs to be reserved for connecting the tabs is reduced on the circuit board connected to the battery 100, and the energy density of the battery 100 is increased.

By connecting the first packaging body 11 and the second packaging body 12 to the partition piece 40 separately, it is convenient to dispose the first electrode assembly 20 and the second electrode assembly 30 in the first cavity 10a and the second cavity 10b respectively. Further, the partition piece 40 disposed between the first packaging body 11 and the second packaging body 12 can increase the structural strength of the housing 10.

In some embodiments, the first packaging body 11 and the second packaging body 12 each independently include at least one of aluminum, aluminum alloy, nickel, nickel alloy, steel, or stainless steel.

Referring to FIG. 6 and FIG. 7, in some embodiments, the housing 10 further includes an explosion-proof valve 13. The explosion-proof valve 13 is disposed in the first packaging body 11 and/or the second packaging body 12. The explosion-proof valve 13 is configured to reduce the hazards of combustion or explosion caused by excessive pressure inside the housing 10.

In some embodiments, the housing 10 further includes two injection ports 14 and two sealing studs 15. The first packaging body 11 and the second packaging body 12 each are provided with an injection port 14. The first packaging body 11 and the second packaging body 12 each are provided with a sealing stud 15 to seal the corresponding injection port 14.

Still referring to FIG. 2, it is defined that the thickness direction of the first electrode assembly 20 is a first direction Z, the width direction of the first electrode assembly 20 is a second direction X, and the length direction of the first electrode assembly 20 is a third direction Y. The first direction Z, the second direction X, and the third direction Y are perpendicular to each other.

In some embodiments, the first electrode assembly 20 and the second electrode assembly 30 are stacked along the first direction Z. The partition piece 40 is connected to the housing 10, and partitions the space in the housing 10 into a first cavity 10a and a second cavity 10b along the first direction Z, where the two cavities are spaced out. The first electrode assembly 20 is disposed in the first cavity 10a, and the second electrode assembly 30 is disposed in the second cavity 10b, so as to reduce the space occupied by the battery 100 in the second direction X and the third direction Y.

Figure 8:
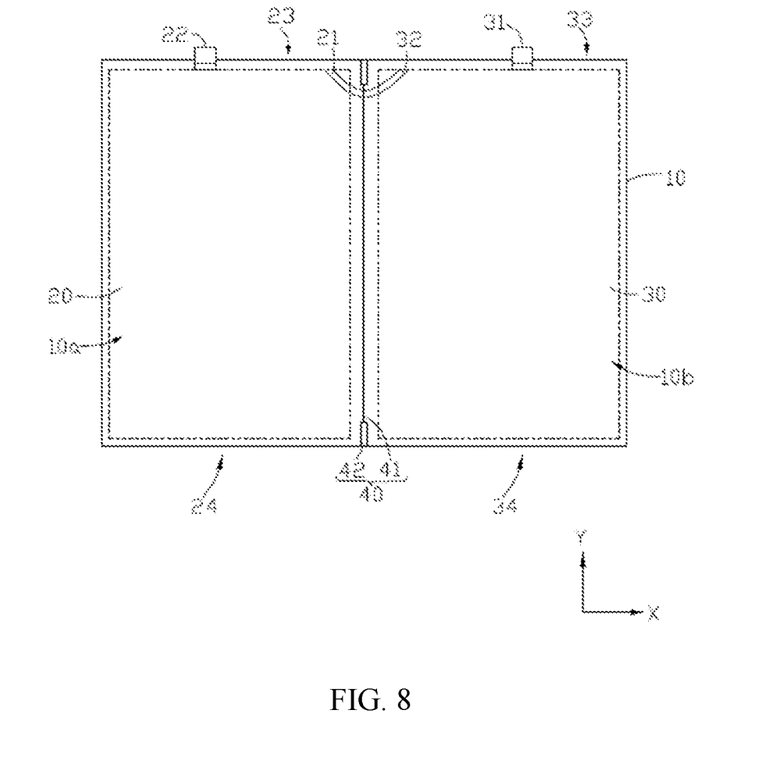
FIG. 8 is a schematic structural diagram of a battery in which a first electrode assembly and a second electrode assembly are disposed in parallel along a second direction according to an embodiment of this application.

Referring to FIG. 8, in some embodiments, the first electrode assembly 20 and the second electrode assembly 30 are disposed in parallel along the second direction X. The partition piece 40 is connected to the housing 10, and partitions the space in the housing 10 into a first cavity 10a and a second cavity 10b along the second direction X, where the two cavities are spaced out. The first electrode assembly 20 is disposed in the first cavity 10a, and the second electrode assembly 30 is disposed in the second cavity 10b, so as to reduce the space occupied by the battery 100 in the first direction Z and the third direction Y.

Understandably, in some embodiments, the first electrode assembly 20 and the second electrode assembly 30 are disposed in parallel along the third direction Y. The partition piece 40 is connected to the housing 10, and partitions the space in the housing 10 into a first cavity 10a and a second cavity 10b along the third direction Y, where the two cavities are spaced out. The first electrode assembly 20 is disposed in the first cavity 10a, and the second electrode assembly 30 is disposed in the second cavity 10b, so as to reduce the space occupied by the battery 100 in the first direction Z and the second direction X.

The first electrode assembly 20 includes a first end 23 and a second end 24 that are disposed opposite to each other along the third direction Y. In some embodiments, the first positive tab 21 is connected to the first end 23 or the second end 24. The first negative tab 22 is connected to the first end 23 or the second end 24. The first positive tab 21 is bent from the first end 23 or the second end 24, and connected to the conductive region 41.

The second electrode assembly 30 includes a third end 33 and a fourth end 34 that are disposed opposite to each other along the third direction Y. In some embodiments, the second positive tab 31 is connected to the third end 33 or the fourth end 34. The second negative tab 32 is connected to the third end 33 or the fourth end 34. The second negative tab 32 is bent from the third end 33 or the fourth end 34, and connected to the conductive region 41.

In some embodiments, the first positive tab 21 and the second negative tab 32 are connected to the conductive region 41 by welding.

Figure 9:
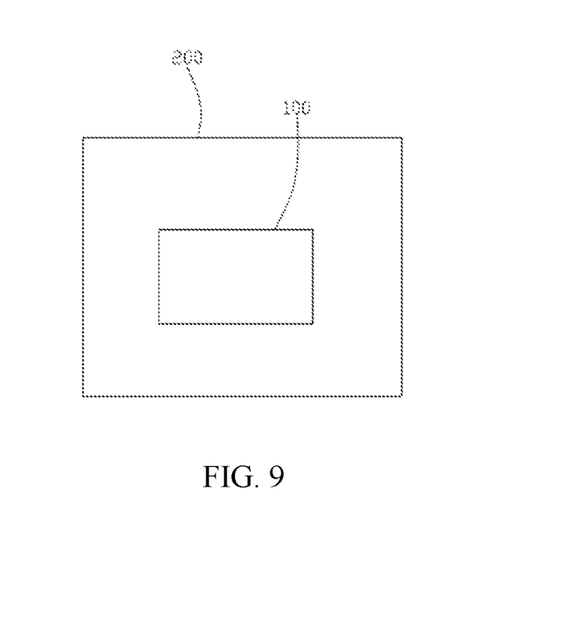
FIG. 9 is a schematic structural diagram of an electric device according to an embodiment of this application.

Referring to FIG. 9, a second aspect of this application further provides an electric device 200. The electric device 200 includes any battery 100 according to the foregoing embodiments.

This application is described below with reference to specific embodiments.

Embodiment 1

The first electrode assembly 20 and the second electrode assembly 30 are stacked along the first direction Z. The partition piece 40 is connected to the housing 10, and partitions the space in the housing 10 into a first cavity 10a and a second cavity 10b along the first direction Z, where the two cavities are spaced out. The first electrode assembly 20 is disposed in the first cavity 10a, and the second electrode assembly 30 is disposed in the second cavity 10b. The first positive tab 21 and the second negative tab 32 are electrically connected to the conductive region 41, so that the first electrode assembly 20 is connected in series to the second electrode assembly 30 through the conductive region 41. The first negative tab 22 extends out of the housing 10 from between the first packaging body 11 and the partition piece 40. The second positive tab 31 extends out of the housing 10 from between the second packaging body 12 and the partition piece 40. Serving as an overall negative terminal of the first electrode assembly 20 and the second electrode assembly 30, the first negative tab 22 is connected to the circuit board. Serving as an overall positive terminal of the first electrode assembly 20 and the second electrode assembly 30, the second positive tab 31 is connected to the circuit board. The partition piece 40 further includes an extension portion 45. The extension portion 45 is electrically connected to the conductive layer 40b and extends out of the housing 10.

Embodiment 2

The first electrode assembly 20 and the second electrode assembly 30 are stacked along the first direction Z. The partition piece 40 is connected to the housing 10, and partitions the space in the housing 10 into a first cavity 10a and a second cavity 10b along the first direction Z, where the two cavities are spaced out. The first electrode assembly 20 is disposed in the first cavity 10a, and the second electrode assembly 30 is disposed in the second cavity 10b. The first positive tab 21 and the second negative tab 32 are electrically connected to the conductive region 41, so that the first electrode assembly 20 is connected in series to the second electrode assembly 30 through the conductive region 41. Both the first packaging body 11 and the second packaging body 12 are electrically conductive. The first negative tab 22 is electrically connected to the first packaging body 11 and accommodated in the first cavity 10a. The second positive tab 31 is electrically connected to the second packaging body 12 and accommodated in the second cavity 10b. Serving as an overall negative terminal of the first electrode assembly 20 and the second electrode assembly 30, the first packaging body 11 is connected to the circuit board. Serving as an overall positive terminal of the first electrode assembly 20 and the second electrode assembly 30, the second packaging body 12 is connected to the circuit board.

In addition, a person of ordinary skill in the art understands that the foregoing embodiments are merely intended to illustrate this application, but not intended to limit this application. All appropriate modifications and changes made to the embodiments without departing from the spirit and conception of this application fall within the protection scope of this application.

What is claimed is:

1. A battery, comprising:
   a housing;
   a first electrode assembly;
   a first positive tab and a first negative tab connected to the first electrode assembly;
   a second electrode assembly;
   a second positive tab and a second negative tab connected to the second electrode assembly;
   a partition piece, wherein the partition piece is connected to the housing to define a first cavity and a second cavity on two sides of the partition piece respectively, the first electrode assembly is disposed in the first cavity, the second electrode assembly is disposed in the second cavity, the partition piece comprises a conductive region, and the first positive tab and the second negative tab are electrically connected to the conductive region; and
   wherein the partition piece further comprises an insulation region, and, in the insulation region, the partition piece comprises a first insulation layer, a conductive layer, and a second insulation layer that are stacked in sequence, and the first insulation layer and the second insulation layer are connected to the housing separately; and, in the conductive region, the partition piece comprises the conductive layer, and the first positive tab and the second negative tab are electrically connected to the conductive layer separately.

2. The battery according to claim 1, wherein the partition piece further comprises an extension portion, and the extension portion is electrically connected to the conductive layer and extends out of the housing.

3. The battery according to claim 1, wherein the housing comprises a first packaging body and a second packaging body, the first packaging body is connected to the first insulation layer to define the first cavity, the second packaging body is connected to the second insulation layer to define the second cavity, the first negative tab extends out of the housing from between the first packaging body and the partition piece, and the second positive tab extends out of the housing from between the second packaging body and the partition piece.

4. The battery according to claim 1, wherein the housing comprises a first packaging body and a second packaging body, the first packaging body is connected to the first insulation layer to define the first cavity, the second packaging body is connected to the second insulation layer to define the second cavity, the first packaging body comprises a first conductive portion, the second packaging body comprises a second conductive portion, the first negative tab is electrically connected to the first conductive portion and accommodated in the first cavity, and the second positive tab is electrically connected to the second conductive portion and accommodated in the second cavity.

5. The battery according to claim 4, wherein the first packaging body and the second packaging body each independently comprise at least one of aluminum, aluminum alloy, nickel, nickel alloy, steel or stainless steel.

6. The battery according to claim 1, wherein the first insulation layer and the second insulation layer each independently comprise at least one of polypropylene, acid anhydride modified polypropylene, polyethylene, poly(ethylene-co-vinyl acetate), poly(ethylene-co-ethyl acrylate), poly(ethylene-co-acrylic acid), poly(ethylene-co-vinyl alcohol), polyvinyl chloride, polystyrene, polyether nitrile, polyurethane, polyamide, polyester, poly(amorphous α-co-olefin), or a derivative thereof; and the conductive layer comprises at least one of Ni, Ti, Cu, Ag, Au, Pt, Fe, Co, Cr, W, Mo, Al, Mg, K, Na, Ca, Sr, Ba, Si, Ge, Sb, Pb, In, Zn, stainless steel, or a combination or alloy thereof.

7. The battery according to claim 1, wherein a thickness direction of the first electrode assembly is a first direction, and the first electrode assembly and the second electrode assembly are stacked along the first direction.

8. The battery according to claim 1, wherein the first electrode assembly is a jelly-roll structure or a stacked structure; and the second electrode assembly is a jelly-roll structure or a stacked structure.

9. An electric device, comprising a battery, wherein the battery comprises:
  a housing;
  a first electrode assembly;
  a first positive tab and a first negative tab connected to the first electrode assembly;
  a second electrode assembly;
  a second positive tab and a second negative tab connected to the second electrode assembly;
  a partition piece, wherein the partition piece is connected to the housing to define a first cavity and a second cavity on two sides of the partition piece respectively, the first electrode assembly is disposed in the first cavity, the second electrode assembly is disposed in the second cavity, the partition piece contains a conductive region, and the first positive tab and the second negative tab are electrically connected to the conductive region; and
  wherein the partition piece further comprises an insulation region, and, in the insulation region, the partition piece comprises a first insulation layer, a conductive layer, and a second insulation layer that are stacked in sequence, and the first insulation layer and the second insulation layer are connected to the housing separately; and, in the conductive region, the partition piece comprises the conductive layer, and the first positive tab and the second negative tab are electrically connected to the conductive layer separately.

10. The electric device according to claim 9, wherein the partition piece further comprises an extension portion, and the extension portion is electrically connected to the conductive layer and extends out of the housing.

11. The electric device according to claim 9, wherein the housing comprises a first packaging body and a second packaging body, the first packaging body is connected to the first insulation layer to define the first cavity, the second packaging body is connected to the second insulation layer to define the second cavity, the first negative tab extends out of the housing from between the first packaging body and the partition piece, and the second positive tab extends out of the housing from between the second packaging body and the partition piece.

12. The electric device according to claim 9, wherein the housing comprises a first packaging body and a second packaging body, the first packaging body is connected to the first insulation layer to define the first cavity, the second packaging body is connected to the second insulation layer to define the second cavity, the first packaging body comprises a first conductive portion, the second packaging body comprises a second conductive portion, the first negative tab is electrically connected to the first conductive portion and accommodated in the first cavity, and the second positive tab is electrically connected to the second conductive portion and accommodated in the second cavity.

13. The electric device according to claim 12, wherein the first packaging body and the second packaging body each independently comprise at least one of aluminum, aluminum alloy, nickel, nickel alloy, steel, or stainless steel.

14. The electric device according to claim 9, wherein the first insulation layer and the second insulation layer each independently comprise at least one of polypropylene, acid anhydride modified polypropylene, polyethylene, poly(ethylene-co-vinyl acetate), poly(ethylene-co-ethyl acrylate), poly(ethylene-co-acrylic acid), poly(ethylene-co-vinyl alcohol), polyvinyl chloride, polystyrene, polyether nitrile, polyurethane, polyamide, polyester, poly(amorphous α-co-olefin), or a derivative thereof; and the conductive layer comprises at least one of Ni, Ti, Cu, Ag, Au, Pt, Fe, Co, Cr, W, Mo, Al, Mg, K, Na, Ca, Sr, Ba, Si, Ge, Sb, Pb, In, Zn, stainless steel, or a combination or alloy thereof.

15. The electric device according to claim 9, wherein a thickness direction of the first electrode assembly is a first direction, and the first electrode assembly and the second electrode assembly are stacked along the first direction.

16. The electric device according to claim 9, wherein the first electrode assembly is a jelly-roll structure or a stacked structure; and the second electrode assembly is a jelly-roll structure or a stacked structure.

\* \* \* \* \*